US011516091B2

(12) United States Patent
Dome et al.

(10) Patent No.: US 11,516,091 B2
(45) Date of Patent: Nov. 29, 2022

(54) CLOUD INFRASTRUCTURE PLANNING ASSISTANT VIA MULTI-AGENT AI

(71) Applicant: AT&T Intellectual Property I, L.P., Atlanta, GA (US)

(72) Inventors: George Dome, Tinton Falls, NJ (US); Chuxin Chen, San Francisco, CA (US); John Oetting, Zionsville, PA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 815 days.

(21) Appl. No.: 16/390,089

(22) Filed: Apr. 22, 2019

(65) Prior Publication Data

US 2020/0336388 A1     Oct. 22, 2020

(51) Int. Cl.
| | | |
|---|---|---|
| H04L 12/24 | (2006.01) |
| G06N 20/00 | (2019.01) |
| G06N 5/04 | (2006.01) |
| H04L 12/927 | (2013.01) |
| H04L 41/16 | (2022.01) |
| H04L 47/80 | (2022.01) |
| H04L 41/14 | (2022.01) |
| H04L 41/5041 | (2022.01) |

(52) U.S. Cl.
CPC ............. *H04L 41/16* (2013.01); *G06N 5/043* (2013.01); *G06N 20/00* (2019.01); *H04L 41/145* (2013.01); *H04L 41/5045* (2013.01); *H04L 47/808* (2013.01)

(58) Field of Classification Search
CPC ... H04L 41/16; H04L 41/145; H04L 41/5045; H04L 47/808; G06N 20/00; G06N 5/043
See application file for complete search history.

(56) References Cited

U.S. PATENT DOCUMENTS

| | | |
|---|---|---|
| 8,396,989 B2 | 3/2013 | Chaturvedi et al. |
| 8,479,181 B2 | 7/2013 | Andrade et al. |
| 8,825,861 B2 | 9/2014 | Rao |
| 9,124,498 B2 | 9/2015 | Jung et al. |

(Continued)

FOREIGN PATENT DOCUMENTS

| | | |
|---|---|---|
| WO | WO 2012/083771 A1 | 6/2012 |
| WO | WO 2017/062384 A1 | 4/2017 |

(Continued)

OTHER PUBLICATIONS

Li et al.; "Cloud Computing for Agent-Based Urban Transportation Systems"; IEEE Intelligent Systems; 2011; p. 73-79.

(Continued)

*Primary Examiner* — Christopher B Robinson
(74) *Attorney, Agent, or Firm* — Guntin & Gust, PLC; Robert Gingher

(57) ABSTRACT

Cloud infrastructure planning systems and methods can utilize artificial intelligence/machine learning agents for developing a plan of demand, plan of record, plan of execution, and plan of availability for developing cloud infrastructure plans that are more precise and accurate, and that learn from previous planning and deployments. Some agents include one or more of supervised, unsupervised, and reinforcement machine learning to develop accurate predictions and perform self-tuning alone or in conjunction with other agents.

20 Claims, 9 Drawing Sheets

(56) References Cited

U.S. PATENT DOCUMENTS

| | | | |
|---|---|---|---|
| 9,203,866 B2 | 12/2015 | Chatterjee et al. | |
| 9,606,840 B2 | 3/2017 | Schaad | |
| 9,712,604 B2 | 7/2017 | Sinha et al. | |
| 9,716,634 B2 | 7/2017 | Sapuram et al. | |
| 9,800,465 B2 | 10/2017 | Steinder et al. | |
| 9,818,127 B2 | 11/2017 | Iyoob et al. | |
| 9,860,134 B2 | 1/2018 | Bogdany et al. | |
| 10,133,608 B2 | 11/2018 | Sapuram et al. | |
| 2012/0089726 A1* | 4/2012 | Doddavula | H04L 67/34 709/224 |
| 2012/0109703 A1 | 5/2012 | Agrawal et al. | |
| 2013/0139152 A1* | 5/2013 | Chang | G06F 40/00 718/1 |
| 2017/0093642 A1 | 3/2017 | Chin et al. | |
| 2017/0171026 A1 | 6/2017 | Lucas et al. | |
| 2017/0270450 A1 | 9/2017 | Binotto et al. | |
| 2017/0289060 A1 | 10/2017 | Aftab et al. | |
| 2018/0241843 A1 | 8/2018 | Bardhan | |
| 2018/0331928 A1 | 11/2018 | Dave et al. | |
| 2018/0349797 A1* | 12/2018 | Garvey | G06F 9/46 |
| 2019/0014023 A1 | 1/2019 | Gupta et al. | |

FOREIGN PATENT DOCUMENTS

| | | |
|---|---|---|
| WO | WO 2018/213991 A1 | 11/2018 |
| WO | WO 2018/234741 A1 | 12/2018 |
| WO | WO 2019/028269 A2 | 2/2019 |

OTHER PUBLICATIONS

Javanmardi et al.; "Hybrid Job scheduling Algorithm for Cloud computing Environment"; Proceedings of the 5$^{th}$ Int'l Conf. on Innovations in Bio-Inspired Computing and Applications Ibica; 2014; 10 pages.

Kurdi et al. "A combinatorial optimization algorithm for multiple cloud service composition"; Computers and Electrical Engineering; vol. 42; 2015; p. 107-113.

Huang et al.; "An adaptive resource management scheme in cloud computing"; Engineering Applications of Artificial Intelligence; vol. 26; 2013; p. 382-389.

* cited by examiner

CLOUD INFRASTRUCTURE PLANNING ASSISTANT VIA MULTI-AGENT AI

TECHNICAL FIELD

The present disclosure relates generally to systems and methods for planning cloud infrastructure, and more particularly concerns using a group of artificial intelligence agents to plan and refine cloud infrastructure.

BACKGROUND

While the "cloud" is sometimes perceived as an available pool of virtual resources, the availability of those resources is dependent upon physical hardware. The type, number, and location of hardware (geographically and logically) all factor into the capacity provided by such hardware to a cloud environment or various clients.

Deployment of such cloud infrastructure must be planned in advance to provide necessary capacity while avoiding overspending. Planning cycles for cloud infrastructure development and deployment can include various planning suites or sub-processes for defining the virtual resources needed, identifying physical resources for providing those virtual resources, selecting solutions built from those resources, then confirming the resources actually provided by an underlying cloud infrastructure. Many aspects of planning cycles are currently performed by human decision-makers, resulting in imperfect information, assumptions, and judgment. Aspects of planning cycles can also be organizationally-bound and/or technically dependent, which can cause bottlenecks in the process and prevent expedient resolution of questions. Furthermore, cloud infrastructure planning projects are approached as independent projects, and so learning from past projects is not consistently considered in future projects.

As such, there is a need to develop cloud infrastructure planning systems and methods that can improve the accuracy, precision, and speed of cloud infrastructure plan development while incorporating data from current and/or past projects to carry forward feedback from planning and execution processes.

SUMMARY

The needs existing in the field are addressed by the present disclosure, which relates to systems, methods and computer useable media for cloud infrastructure planning.

In one aspect, a cloud infrastructure planning system, comprises a plan of demand assistant configured to generate a site solution to a forecasted capacity demand set, wherein the site solution is based on a capacity correlation derived from a historical site solution data set. The system also comprises a plan of record advisor configured to generate a plan of record for the site solution, wherein the plan of record is based on an infrastructure correlation derived from a historical infrastructure data set. The system also comprises a plan of execution analyzer configured to generate an execution design defining equipment meeting the plan of record, wherein the execution design is based on an equipment correlation derived from a historical equipment data set. The system also comprises a plan of availability evaluator configured to generate a resource prediction defining a service level based on the execution design, wherein the resource prediction is based on an availability correlation derived from a historical availability data set.

In another aspect, a method comprises receiving cloud infrastructure planning data and generating a site solution to a forecasted capacity demand set, wherein the site solution is based on the cloud infrastructure planning data and a capacity correlation derived from a historical site solution data set. The method also comprises generating a plan of record for the site solution, wherein the plan of record is based on an infrastructure correlation derived from a historical infrastructure data set. The method also comprises generating an execution design defining equipment meeting the plan of record, wherein the execution design is based on an equipment correlation derived from a historical equipment data set. The method also comprises generating a resource prediction defining a service level based on the execution design, wherein the resource prediction is based on an availability correlation derived from a historical availability data set.

In another aspect, non-transitory computer-readable medium storing instructions that when executed by a processor effectuate operations. The operations can relate to or implement systems or methods disclosed herein.

This summary is intended to provide a short description of some aspects only. Additional and alternative details will be apparent on review of other portions of this disclosure.

DETAILED DESCRIPTION OF ILLUSTRATIVE EMBODIMENTS

Figure 1:
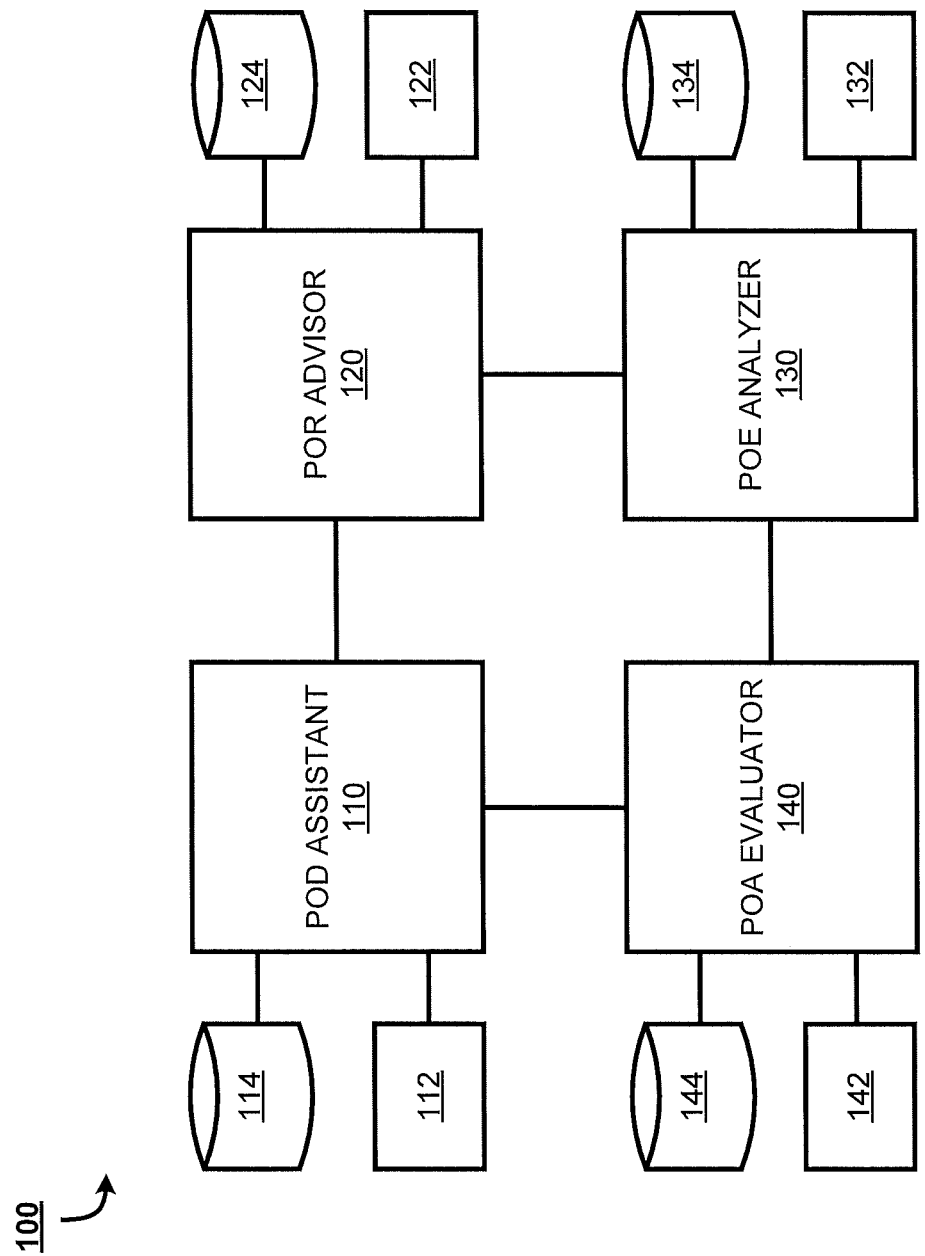
FIG. 1 is an example block diagram of a system disclosed herein.

Aspects herein relate to the use of artificial intelligence (AI) and machine learning agents (ML) for assisting or handling a cloud infrastructure planning process.

An example cloud infrastructure planning process can involve four planning aspects (e.g., suites, sub-processes, components) comprising plan of demand (POD), plan of record (POR), plan of execution (POE), and plan of availability (POA). The accuracy of the cloud infrastructure planning cycle is employed to achieve target utilization of available expenditures (e.g., capital and expense) and deliver infrastructure to meet customer demands and business objectives. The cycle begins with the POD, which provides a prioritized view of forecasted capacity demands (e.g., service and network). The POR takes the POD and based on prioritization determines the "doability" and cost of the various infrastructure teams (e.g., power, space, transport). Based on funding level, the POE defines what will be built and when. Based on the POE, the POA provides a view of available service and network capacity that will be provided by the completed POE.

Inaccuracies in any of POD, POR, POE, and/or POA creates risks of over-building the infrastructure, stranding assets, and/or not meeting customer demand and business objectives. Despite the importance of deploying the right resources, many planning aspects are based on human judgment calls, and lessons learned by those humans may not be captured or provided in feedback for ongoing or subsequent cloud infrastructure plans. Further, given the cyclical nature and interdependence of aspects of the planning cycle, slow or incorrect action by personnel focused in different planning cycle areas can bottleneck planning efforts in others.

By using the AI/ML agents described herein, different aspects of the planning cycle can be developed independently and concurrently. As infrastructure deployment is not a process of simple math but depends on a variety of complex variables, the agents can discern complicated or previously-unrecognized correlations to provide better planning and corresponding estimates of gains from execution of those plans. In embodiments, the independence of the agents with respect to one another prevents bottlenecks and allows independent review and/or confirmation in each portion of the planning cycle. All agents can ingest information and feedback in an ongoing basis to learn from feedback. In this manner, human judgment calls can be reduced or eliminated and higher performing, more efficient cloud infrastructure deployments can be completed.

Artificial intelligence or machine learning herein can include a variety of techniques for discovering correlations or refining analyses performed while searching for patterns or correlations. Supervised machine learning involves training of an agent using labeled training data as a set of training examples. In this manner, examples which are provided to identify relationships can be mapped to new data where relationships are not identified. Unsupervised learning, in contrast, can analyze data that has not been labeled, classified, categorized, or otherwise prepared with details for how to identify relationships, correlations, patterns, et cetera. Reinforcement machine learning involves the ingestion of additional data to allow the AI/ML agents to self-improve based on the additional feedback or evaluation data and application of their current calculations to data representing actual outcomes based on their previous calculations.

FIG. 1 illustrates cloud infrastructure planning system 100. Cloud infrastructure planning system 100 includes POD assistant 110, POR advisor 120, POE analyzer 130, and POA evaluator 140, all of which are AI/ML agents.

POD assistant 110 is configured to generate a site solution to a forecasted capacity demand set, wherein the site solution is based on a capacity correlation derived from historical site solution data set 114. The site solution can include, e.g., absolute demand, virtual network function (VNF) prioritization, and placement constraints. The capacity correlation can be determined by supervised machine learning. Training data sets can include labeled historical records within historical site solution data set 144. POD assistant 110 can have associated POD interface 112 (or multiple interfaces) for, e.g., providing or receiving data in textual, coded, and/or graphical forms between entities and systems involved in the POD process.

Further, reinforcement ML can be utilized to improve the performance of POD assistant 110, such as acceptance data. Historical site solution data set 114 can include acceptance data concerning a prior site solution generated by the plan of demand assistant. Acceptance data can include, e.g., whether a site solution was approved by a user, whether a site solution advanced to subsequent planning, whether a site solution was actually implemented through deployment of a plan based thereon, whether an implemented site solution accurately reflects the expectations and calculations on which it was based, et cetera. More generally, historical site solution data set 114 can include previous site assessments by implementation teams, AI/ML study, et cetera.

POR advisor 120 is configured to generate a plan of record for the site solution, wherein the plan of record is based on an infrastructure correlation derived from historical infrastructure data set 124. The POR can include, e.g., one or more sites to implement. The infrastructure correlation can be determined by unsupervised machine learning. While POR can, when run by humans, be driven by business priorities, the POR assistant can recommend site assessments that discover hidden patterns or constraints based on records of implementations and deployments within historical infrastructure data set 124. POR advisor 120 can have associated POR interface 122 (or multiple interfaces) for, e.g., providing or receiving data in textual, coded, and/or graphical forms between entities and systems involved in the POR process.

Further, reinforcement ML can be utilized to improve the performance of POR advisor 120, such as acceptance data (e.g., whether a POR developed by POR advisor 120 was utilized after being generated). Historical infrastructure data set 124 can include acceptance data concerning a prior plan of record generated by the plan of record advisor.

POE analyzer 130 is configured to generate an execution design defining equipment meeting the plan of record, wherein the execution design is based on an equipment correlation derived from historical equipment data set 134. Equipment meeting the plan of record is the commitment for the planned buildout, and there can be multiple possible sets of equipment for satisfying the planned buildout. The POE can include actual augmentation and activation dates. A variety of data can be considered to determine possible equipment satisfying the requirements. For example, based on historical over-booking ratio of cloud site(s), POE analyzer 130 can recommend better over-booking ratios using supervised ML. In another example, based on previous service/network VNF utilization, POE analyzer 130, using supervised ML, can recommend adjusting the VNF(s) size(s). In another example, based on the VNF utilization, POE analyzer 130 can use unsupervised ML to detect hidden patterns and constraints at a given site service utilizations to recommend adjustments to the VNF sizing. The equipment correlation can thus be determined by one or both of supervised and unsupervised machine learning.

POE analyzer 130 can have associated POE interface 132 (or multiple interfaces) for, e.g., providing or receiving data in textual, coded, and/or graphical forms between entities and systems involved in the POE process.

Further, reinforcement ML can be utilized to improve the performance of POE analyzer 130, such as acceptance data (e.g., whether a POE developed by POE analyzer 130 was utilized after being generated). Historical equipment data set 134 can include acceptance data concerning a prior execution design generated by the plan of execution analyzer.

POA evaluator 140 is configured to generate a resource prediction defining a service level based on the execution design, wherein the resource prediction is based on an availability correlation derived from historical availability data set 144. The availability correlation can be determined by supervised machine learning. The resource prediction can determine whether the site build plans are expected to deliver or delivered the target benefits (e.g., business, network metrics, et cetera). The POA as well as post-implementation assessments can include, e.g., resource utilization, inventory status, and performance metrics. Based thereon, POA evaluator 140 can also provide data to, e.g., POD assistant 110, POR advisor 120, and/or POE analyzer 130 to make future adjustments. As this suggests, the various AI/ML agents may interact among one another to provide data for ingestion, training data, feedback, et cetera. In this manner, they can maintain calculatory independence while still benefiting from the data developed by other agents.

POA evaluator 140 can have associated POA interface 142 (or multiple interfaces) for, e.g., providing or receiving data in textual, coded, and/or graphical forms between entities and systems involved in the POA process.

Historical availability data set 144 can include accuracy data concerning a prior resource prediction generated by the plan of availability evaluator. Such accuracy data can reflect the predicted availability and the actual availability provided after a deployment. This accuracy data can be used with reinforcement ML to refine the operation of POA evaluator when its predictions diverge from actual results.

As discussed above, the AI/ML agents can interact in various fashions. In another example, AI/ML agents can evaluate POR and/or POE change requests (e.g., when a POR or POE is selected and subsequently changed before the deployment is complete) to refine operation of POR advisor 120 and/or POE analyzer 130. Self-tuning through reinforcement learning can be performed through collective interaction of AI/ML agents in this and other manners.

The various agents and interfaces of system 100 can be provided to different users and/or using different hardware or computer systems. As used herein, a different user can be a different operator or reviewer, different account, et cetera, and can be associated with different roles, permissions, or approvals (e.g., to review, supplement, utilize, or approve various plans or information developed by the agents). As used herein, a different computer system or different hardware can comprise software run locally on physically distinct machines or software run remotely or in a cloud environment such that different software provided to different systems involves distinct network addresses or clients.

Moreover, interfaces herein can include, but are not limited to, graphical user interfaces, application programming interfaces, or other interfaces between humans and/or machines. In embodiments, interfaces can be configured to interact with one or more planning suites or separate software packages for collecting cloud infrastructure information or conducting one or more aspects of cloud infrastructure planning.

Data sets described herein (114, 124, 134, 144) can be understood to be static or dynamic in various embodiments, and can be supplemented in an ongoing fashion as data becomes available from various sources including real-world implementations, planning conducted by the AI/ML agents, planning conducted by other systems or entities, et cetera. Further, while data sets are described as "historical," they need not be and can reflect current data or other information.

Cloud infrastructure planning system 100 can be utilized in manual, semi-automatic, or automatic embodiments. Manual embodiments can develop and generate proposals or solutions for review by operators in various phases of the planning cycle. Automatic embodiments can provide a closed-loop capacity planning system operating independent of operator input to meet infrastructure needs. Semi-automatic embodiments can blend both manual and automatic components. Over time, manual or semi-automatic embodiments can be enhanced to include further automation, or become automated, through self-tuning of the AI/ML agents. In this manner, infrastructure build plans can be developed faster and more accurately to meet financial, customer, and business needs.

While cloud infrastructure planning system 100 is illustrated as a group of distinct AI/ML agents, in embodiments one or more of the AI/ML agents can be combined, or a single interface could be provided to interact with two or more of the AI/ML agents, without departing from the scope or spirit of the disclosure.

Figure 2:
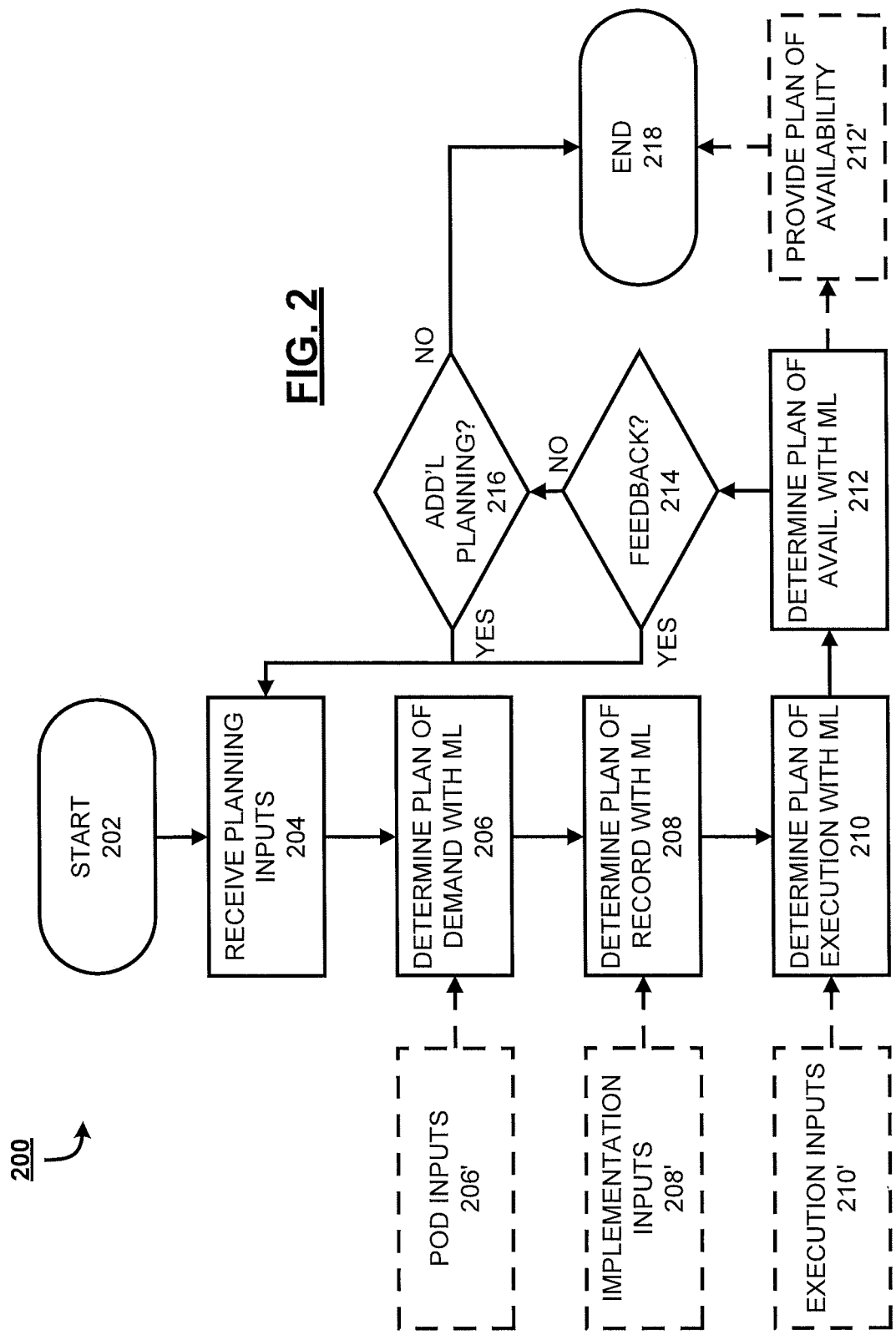
FIG. 2 is an example flow chart of a methodology disclosed herein.

FIG. 2 illustrates an example methodology 200 for cloud infrastructure planning. Methodology 200 begins at 202 and proceeds to 204 where an aspect involves receiving cloud infrastructure planning data. This can include cloud policies or rules (general or specific to the implementation, customer, provider, et cetera), growth predictions, market forecasts, as well as various historical data sets used by AI/ML agents to develop plans or solutions.

At 206 a plan of demand can be developed. This can include, but is not limited to, generating a site solution to a forecasted capacity demand set, wherein the site solution is based on the cloud infrastructure planning data and a capacity correlation derived from a historical site solution data set. In embodiments, an aspect at 206' can include receiving POD inputs, such as the historical site solution data set, policies or rules, growth predictions, market forecasts, et cetera. The POD can be developed using an AI/ML agent, such as a POD assistant disclosed herein. In embodiments, the capacity correlation is determined by supervised machine learning.

At 208, a plan of record can be developed. This can include, but is not limited to, generating a plan of record for the site solution, wherein the plan of record is based on an infrastructure correlation derived from a historical infrastructure data set. In embodiments, an aspect at 208' can include receiving POR inputs, such as the historical infrastructure data set, implementation teams input, and/or the POD, et cetera. The POR can be developed using an AI/ML agent, such as a POR advisor disclosed herein. In embodiments, the infrastructure correlation is determined by unsupervised machine learning.

At 210, a plan of execution can be developed. This can include, but is not limited to, generating an execution design defining equipment meeting the plan of record, wherein the execution design is based on an equipment correlation derived from a historical equipment data set. In embodiments, an aspect at 210' can include receiving POE inputs, such as the historical equipment data set, project management inputs (e.g., financial information, project milestones), design or engineering inputs (e.g., server configuration, placement optimization, engineering rules), and/or the POR, et cetera. The POE can be developed using an AI/ML agent, such as a POE analyzer disclosed herein. In embodiments, the equipment correlation is determined by one or both of supervised and unsupervised machine learning.

At 212, a plan of availability can be developed. This can include, but is not limited to, generating a resource prediction defining a service level based on the execution design, wherein the resource prediction is based on an availability correlation derived from a historical availability data set. The POE or other aspects utilized or generated in other aspects of methodology 200 can be provided for development of the POA. The POA can be developed using an AI/ML agent, such as a POA evaluator disclosed herein. The POA (or other information) generated can describe, e.g., available service and network capacity. In embodiments, the availability correlation is determined by supervised machine learning.

At 214, a determination is made as to whether feedback is available (e.g., from a previous aspect of methodology 200, from various data sources). If no feedback is received, methodology 200 proceeds to 216, where a determination is made as to whether additional planning should be pursued. If no additional planning is to be performed, methodology 200 ends at 218. If either determination at 214 or 216 returns positive, methodology 200 recycles to 204 (or any other aspect at which further planning should be completed).

In embodiments, following 212, one or more aspects generated or determined can be provided to an interface (e.g., to present to a user, to provide to a planning suite or other system, et cetera) at 212'. In embodiments, methodology 200 can include providing a first interface configured to display a first one of the site solution, the plan of record, the execution design, and the resource prediction. Methodology 200 can further include providing a second interface configured to display a second one of the site solution, the plan of record, the execution design, and the resource prediction, wherein the second interface is different from the first interface. Thereafter, methodology 200 can end at 218, or recycle to other portions.

Figure 3:
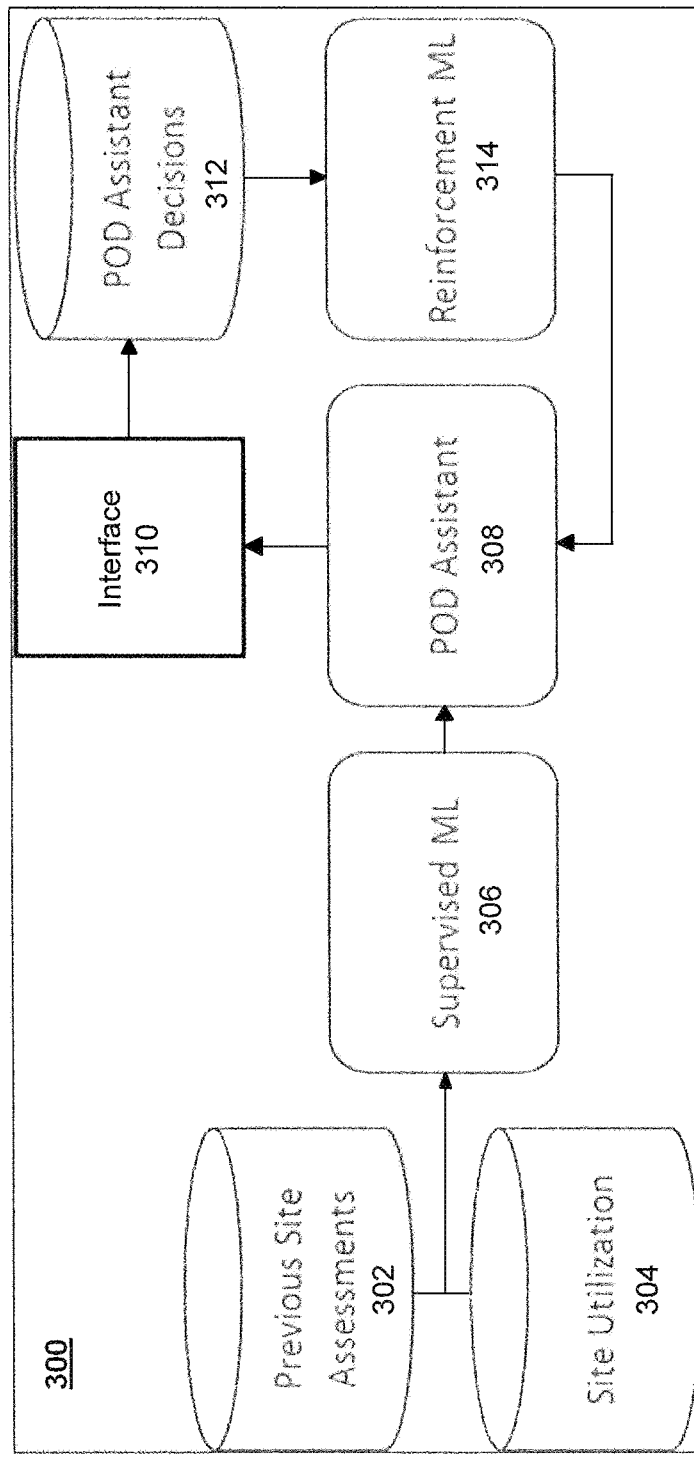
FIG. 3 is an example flow chart of a methodology disclosed herein.

FIG. 3 illustrates an example functional diagram 300 for utilizing a POD agent. Data utilized to develop a POD in the form of previous site assessments 302 and site utilization 304 can be ingested by supervised ML 306. In embodiments, various other inputs relevant to POD can be ingested. Supervised ML 306 identifies patterns, correlations, or other insights to provide to POD assistant 308. POD assistant 308 can then provide a POD, recommendations related thereto, or other information (one or more of which can include but are not limited to one or more site solutions) to interface 310. Interface 310 can be an interface to a software suite or app, a graphical user interface, or combinations thereof.

Interface 310 can also be operatively coupled with (or may include) systems for tracking the result of PODs or recommendations by POD assistant 308. In this manner, outcomes can be provided to or stored in POD assistant decisions 312. In embodiments, POD assistant decisions 312 can be an external database not directly coupled to interface 310 or other aspects (other than reinforcement ML 314) herein. Information in POD assistant decisions 312 can be ingested by reinforcement ML 314 to assist with tuning of POD assistant 308. Based on correlations, patterns, or other information related to the acceptance or implementation of work by the system, POD assistant 308 (and/or supervised ML 306) can be tuned or re-trained.

Figure 4:
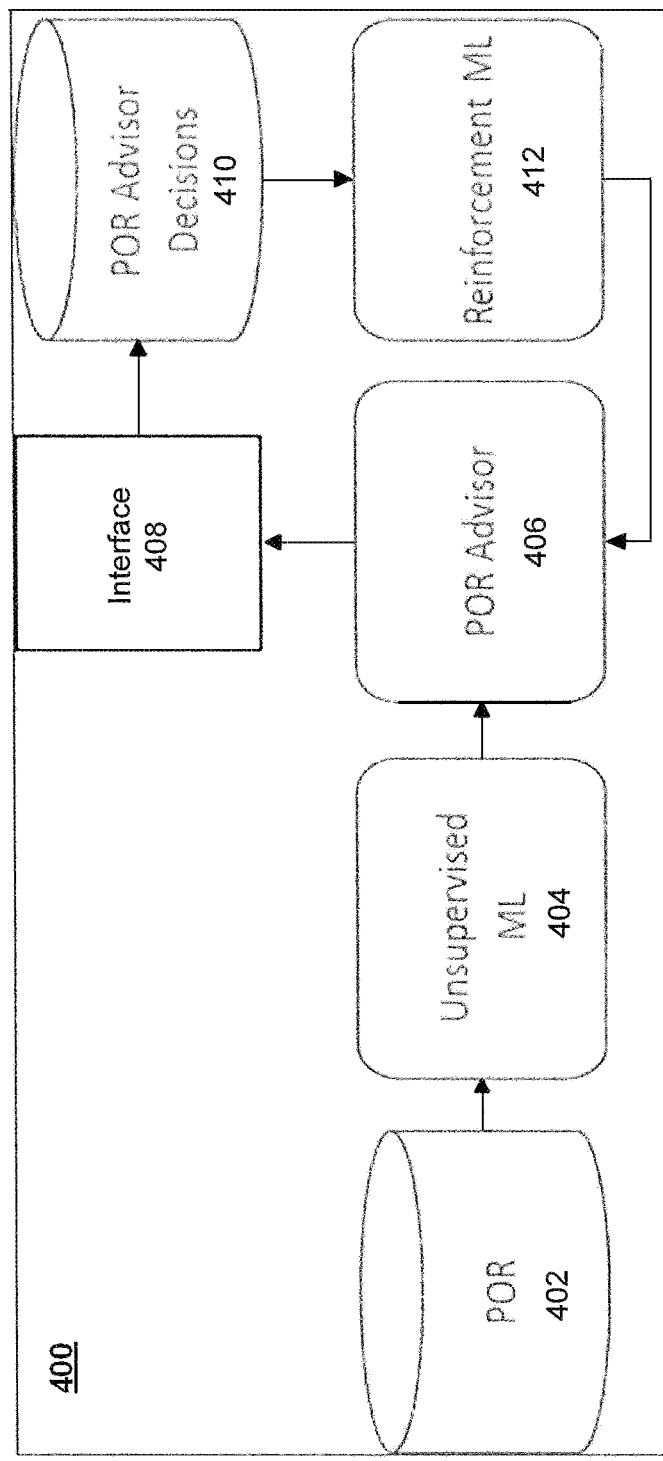
FIG. 4 is an example flow chart of a methodology disclosed herein.

FIG. 4 illustrates an example functional diagram 400 for utilizing a POR agent. Data utilized to develop or refine a POR in form of POR input data 402 can be ingested by unsupervised ML 404. Unsupervised ML 404 can identify previously unrecognized patterns and constraints in data sets including records from implementations and deployments. These patterns and/or constraints, and/or recommendations or insights based thereon, are provided to POR advisor 406. POR advisor 406 can then provide a POR, recommendations related thereto, or other information (one or more of which can include but are not limited to one or more site assessments) to interface 408. Interface 408 can be an interface to a software suite or app, a graphical user interface, or combinations thereof.

Interface 408 can also be operatively coupled with (or may include) systems for tracking the result of PORs or recommendations by POR advisor 406. In this manner, outcomes can be provided to or stored in POR advisor decisions 410. In embodiments, POR advisor decisions 410 can be an external database not directly coupled to interface 408 or other aspects (other than reinforcement ML 412) herein. Information in POD assistant decisions 312 can be ingested by reinforcement ML to assist with tuning of POR advisor 406. Based on correlations, patterns, or other information related to the acceptance or implementation of work by the system, POR advisor 406 (and/or unsupervised ML 404) can be tuned or re-trained.

Figure 5:
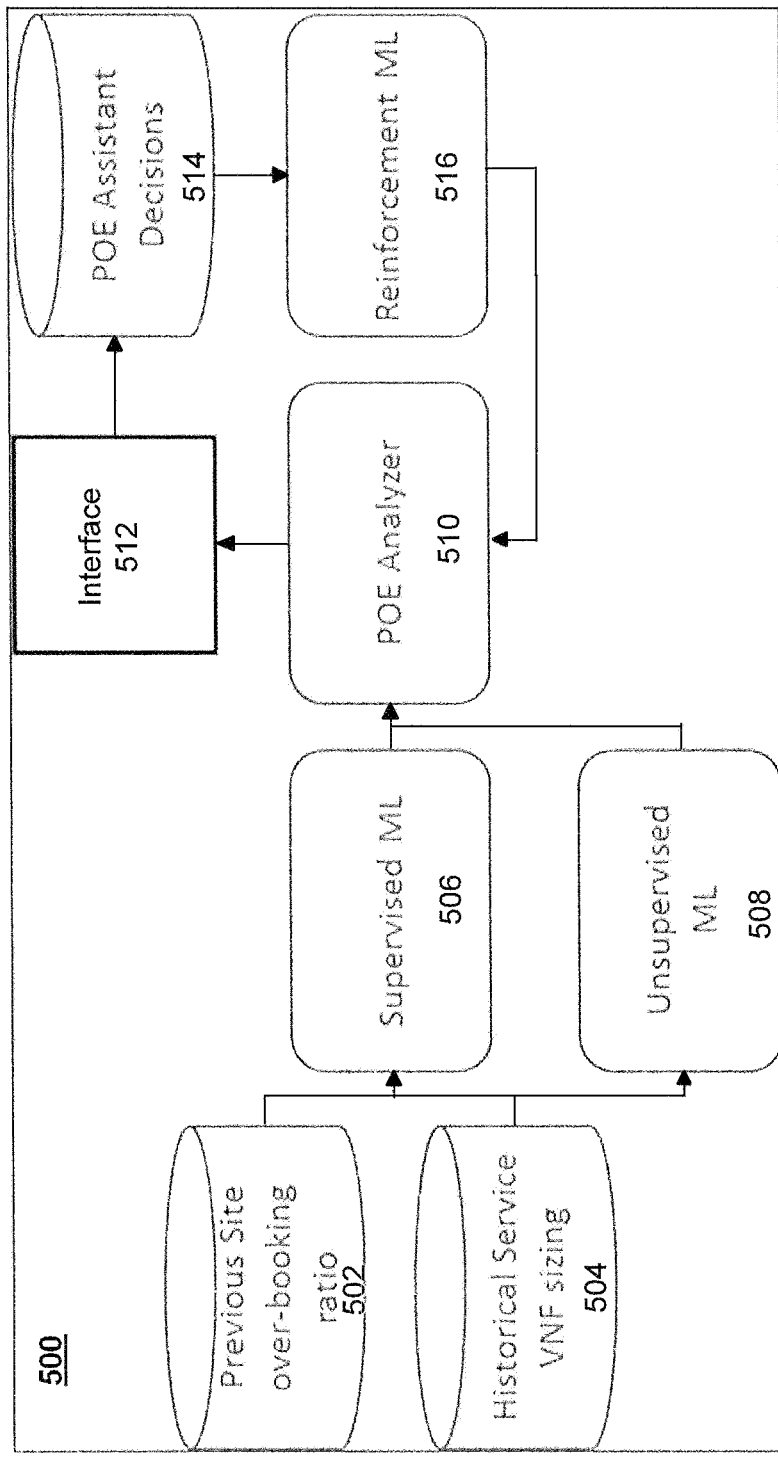
FIG. 5 is an example flow chart of a methodology disclosed herein.

FIG. 5 illustrates an example functional diagram 500 for utilizing a POE agent. Data utilized to develop a POE in the form of previous site over-booking ratios, historical service VNF sizing, et cetera, can be ingested by both supervised ML 506 and unsupervised ML 508. Supervised ML can use labeled records to identify recommendations from the data sets, while unsupervised ML 508 can determine previously undiscovered patterns or constraints for a given service utilization (e.g., to recommend adjustments to the VNF sizing). Results of both analyses can be provided to POE analyzer 510. POE analyzer 510 can provide a POE, or information related thereto, to interface 512. Interface 512 can be an interface to a software suite or app, a graphical user interface, or combinations thereof.

Interface 512 can also be operatively coupled with (or may include) systems for tracking the result of POEs or recommendations by POE analyzer 510. In this manner, outcomes can be provided to or stored in POE assistant decisions 514. In embodiments, POE assistant decisions 514 can be an external database not directly coupled to interface 512 or other aspects (other than reinforcement ML 314) herein. Information in POE assistant decisions 514 can be ingested by reinforcement ML 516 to assist with tuning of POE analyzer 510. Based on correlations, patterns, or other information related to the acceptance or implementation of work by the system, POE analyzer 510 (and/or supervised ML 506 and/or unsupervised ML 508) can be tuned, re-trained, or otherwise modified.

Figure 6:
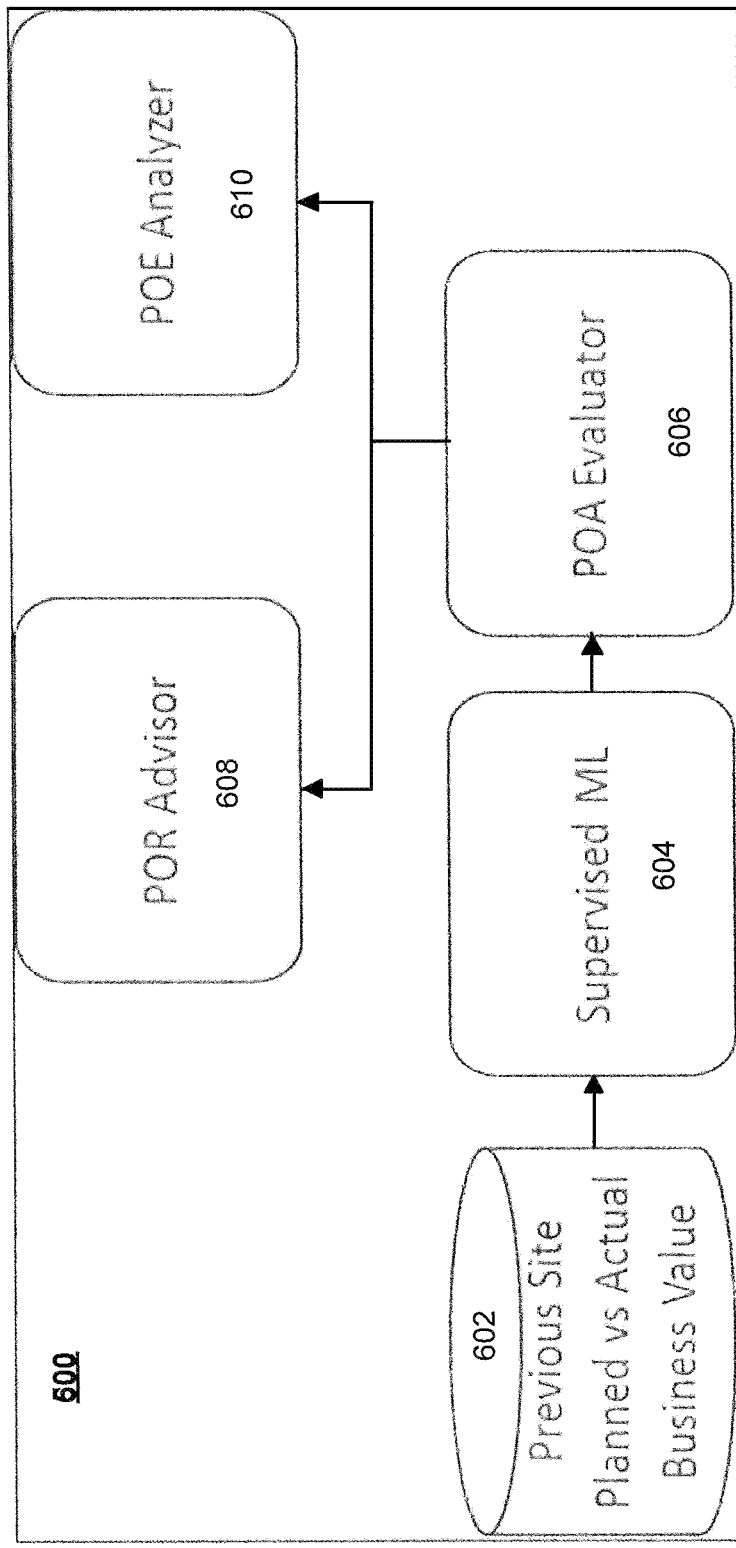
FIG. 6 is an example flow chart of a methodology disclosed herein.

FIG. 6 illustrates an example functional diagram 600 for utilizing a POA agent. Outcome information 602 can include but is not limited to data on previously planned sites and data on the actual business value or results delivered in implementation of those previously planned sites. Outcome information is ingested by supervised ML 604, which can compare the outcomes to expectations. Based on patterns, correlations, or other information, POA evaluator 606 can adjust the parameters using which site planning occurs to allow for better estimation of execution variables matching target needs. The supervised ML can be trained on labeled sets or matches for which plans were highly accurate, or using other training data. POA evaluator 606 can then provide updated algorithms, variables, parameters, training data, et cetera, to, e.g., a POR advisor 608 (which may be similar or identical to another POR advisor or agent disclosed herein), a POE analyzer 610 (which may be similar or identical to another POE analyzer or agent disclosed herein), or other associated systems, subsystems, or agents to tune their processes.

Figure 7:
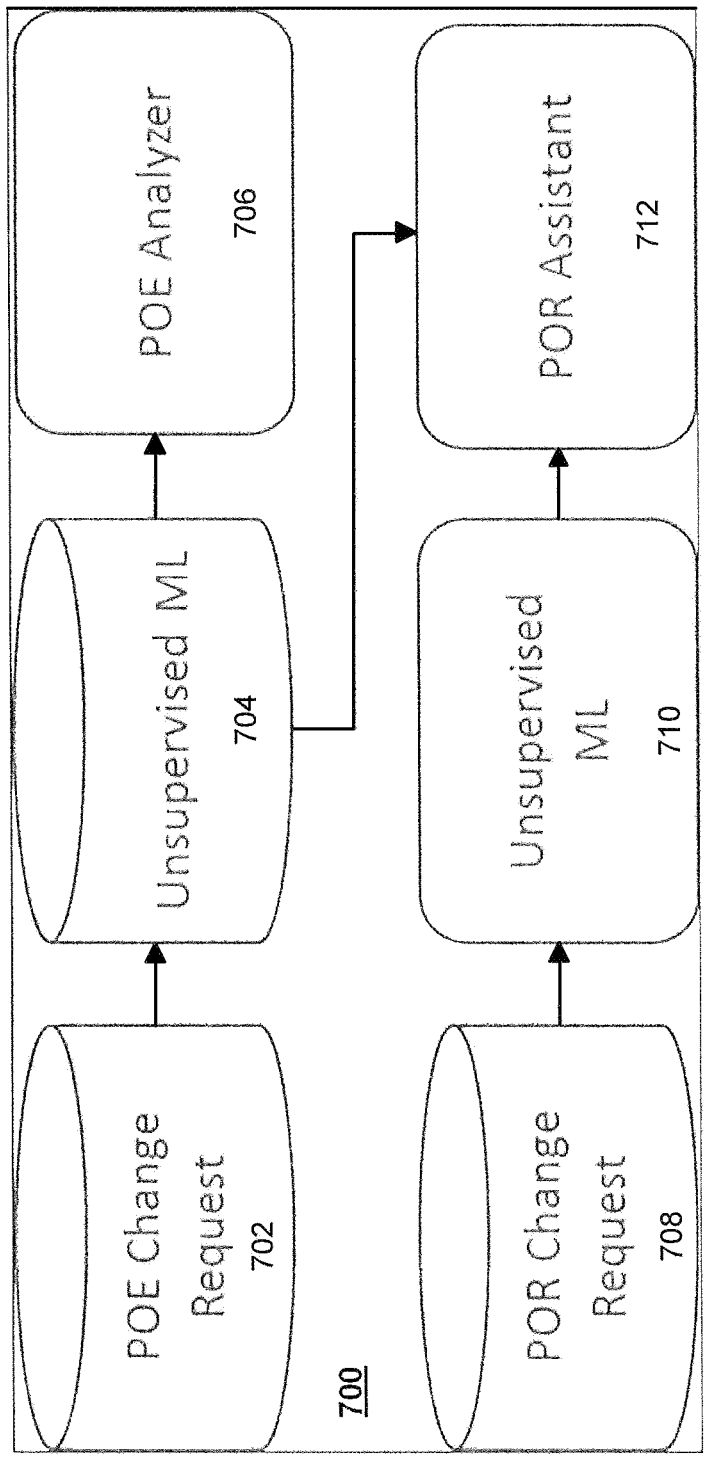
FIG. 7 is an example flow chart of a methodology disclosed herein.

FIG. 7 illustrates an example functional diagram 700 for tuning systems herein or facilitating feedback into ML employed. Change requests are modifications to an existing plan. By reviewing change requests in planned POEs, PORs, et cetera, a determination can be made as to the accuracy, usefulness, or robustness of POEs, PORs, et cetera developed by systems herein. Feedback based on change requests can be used to tune, train, retrain, modify, update, or otherwise change the function of agents, ML, or other aspects disclosed herein.

POE change request database 702 provides information regarding POE change requests (e.g., change requests related to one or more POEs or received during a POE phase) to be ingested by unsupervised ML 704. Based on the patterns, correlations, or other insights discovered by unsupervised ML 704, updates or modifications can be provided to POE analyzer 706 as well as POR assistant 712 (because an inaccurate POR will result in an inaccurate POE). Similarly, POR change request database 708 provides information regarding POR change requests (e.g., change requests related to one or more PORs or received during a POR phase) to be ingested by unsupervised ML 710. Based on the patterns, correlations, or other insights discovered by unsupervised ML 704, updates or modifications can be provided to POR assistant 712. In this manner, systems herein can self-tune based on implicit feedback and regular system function, rather than requiring administrators or operators to prompt refinement.

As can be appreciated, elements of the system, such as the AI/ML agents can be implemented in one or more computer or electronic systems. The agents and portions thereof can comprise code, processors, instructions, applications, functions, processes, tasks, et cetera, and structure for effectuating their instantiation and action can be embodied in local or remote computing hardware. When remote, hardware may comprise dedicated servers, shared servers, cloud environments, et cetera.

Figure 8:
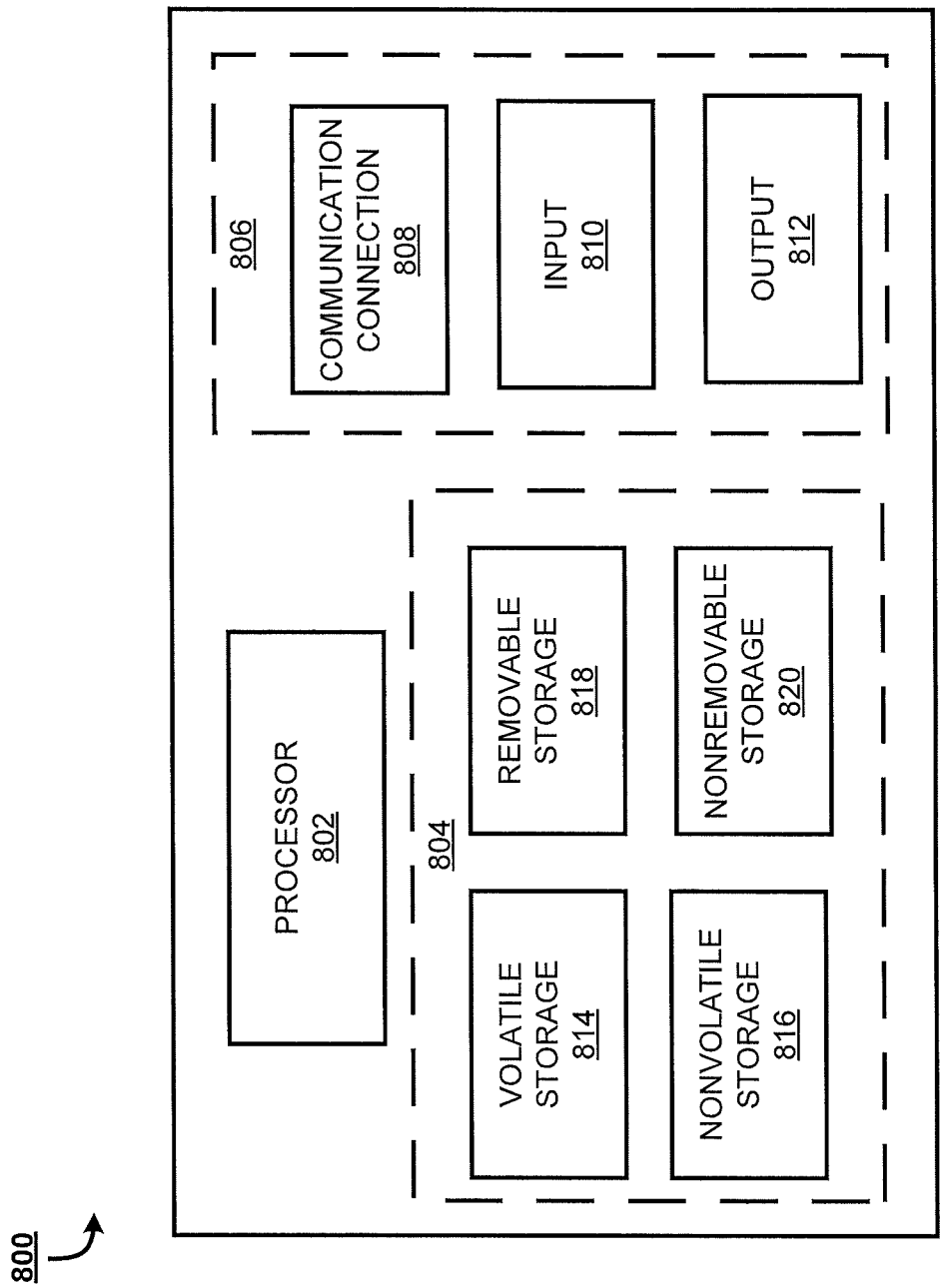
FIG. 8 is a block diagram illustrating an example implementation of a device which can be utilized in conjunction with or comprise a portion of systems disclosed or implement or execute methods herein.

For example, FIG. 8 illustrates a device 800. Device 800 or portions thereof may comprise, store, execute, implement, or otherwise effectuate all or a part of modules, agents, assistants, advisors, analyzers, evaluators, and/or components herein. Device 800 may comprise hardware or a combination of hardware and software. The functionality to facilitate telecommunications via a telecommunications network may reside in one or combinations of links, portals, or connections. Device 800 depicted in FIG. 8 may represent or perform functionality of an appropriate device 800, or combination of modules or components herein. It is emphasized that the block diagram depicted in FIG. 8 is example and not intended to imply a limitation to a specific implementation or configuration. Thus, device 800 may be implemented in a single device or multiple devices. Multiple network entities may be distributed or centrally located. Multiple network entities may communicate wirelessly, via hard wire, or any appropriate combination thereof.

Device 800 may comprise a processor 802 and a memory 804 coupled to processor 802. Memory 804 may contain executable instructions that, when executed by processor 802, cause processor 802 to effectuate operations associated with aspects disclosed herein. As evident from the description herein, device 800 is not to be construed as software per se.

In addition to processor 802 and memory 804, device 800 may include an input/output system 806. Processor 802, memory 804, and input/output system 806 may be coupled together (coupling not shown in FIG. 8) to allow communications there between. Each portion of device 800 may comprise circuitry for performing functions associated with each respective portion. Thus, each portion may comprise hardware, or a combination of hardware and software. Accordingly, each portion of device 800 is not to be construed as software per se. Input/output system 806 may be capable of receiving or providing information from or to a communications device or other network entities configured for telecommunications. For example input/output system 806 may include a wireless communications (e.g., WiFi/2.5G/3G/4G/GPS) card. Input/output system 806 may be capable of receiving or sending video information, audio information, control information, image information, data, or any combination thereof. Input/output system 806 may be capable of transferring information with device 800. In various configurations, input/output system 806 may receive or provide information via any appropriate means, such as, for example, optical means (e.g., infrared), electromagnetic means (e.g., RF, WiFi, Bluetooth®, ZigBee®), acoustic means (e.g., speaker, microphone, ultrasonic receiver, ultrasonic transmitter), or a combination thereof. In an example configuration, input/output system 806 may comprise a WiFi finder, a two-way GPS chipset or equivalent, or the like, or a combination thereof.

Input/output system 806 of device 800 also may contain communication connection 808 that allows device 800 to communicate with other devices, network entities, or the like. Communication connection 808 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 806 also may include an input device 810 such as keyboard, mouse, pen, voice input device, or touch input device. Input/output system 806 may also include an output device 812, such as a display, speakers, or a printer.

Processor 802 may be capable of performing functions associated with aspects described herein. For example, processor 802 may be capable of, in conjunction with any other portion of device 800, managing social media communications as described herein.

Memory 804 of device 800 may comprise a storage medium having a concrete, tangible, physical structure. As is known, a signal does not have a concrete, tangible, physical structure. Memory 804, as well as any computer-readable storage medium described herein, is not to be construed as a signal. Memory 804, as well as any computer-readable storage medium described herein, is not to be construed as a transient signal. Memory 804, as well as any computer-readable storage medium described herein, is not to be construed as a propagating signal. Memory 804, as well as any computer-readable storage medium described herein, is to be construed as an article of manufacture.

Memory 804 may store any information utilized in conjunction with telecommunications. Depending upon the exact configuration or type of processor, memory 804 may include a volatile storage 814 (such as some types of RAM), a nonvolatile storage 816 (such as ROM, flash memory), or a combination thereof. Memory 804 may include additional storage (e.g., a removable storage 818 or a nonremovable storage 820) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 800. Memory 804 may comprise executable instructions that, when executed by processor 802, cause processor 802 to effectuate operations for, e.g., listening to social media activity.

Figure 9:
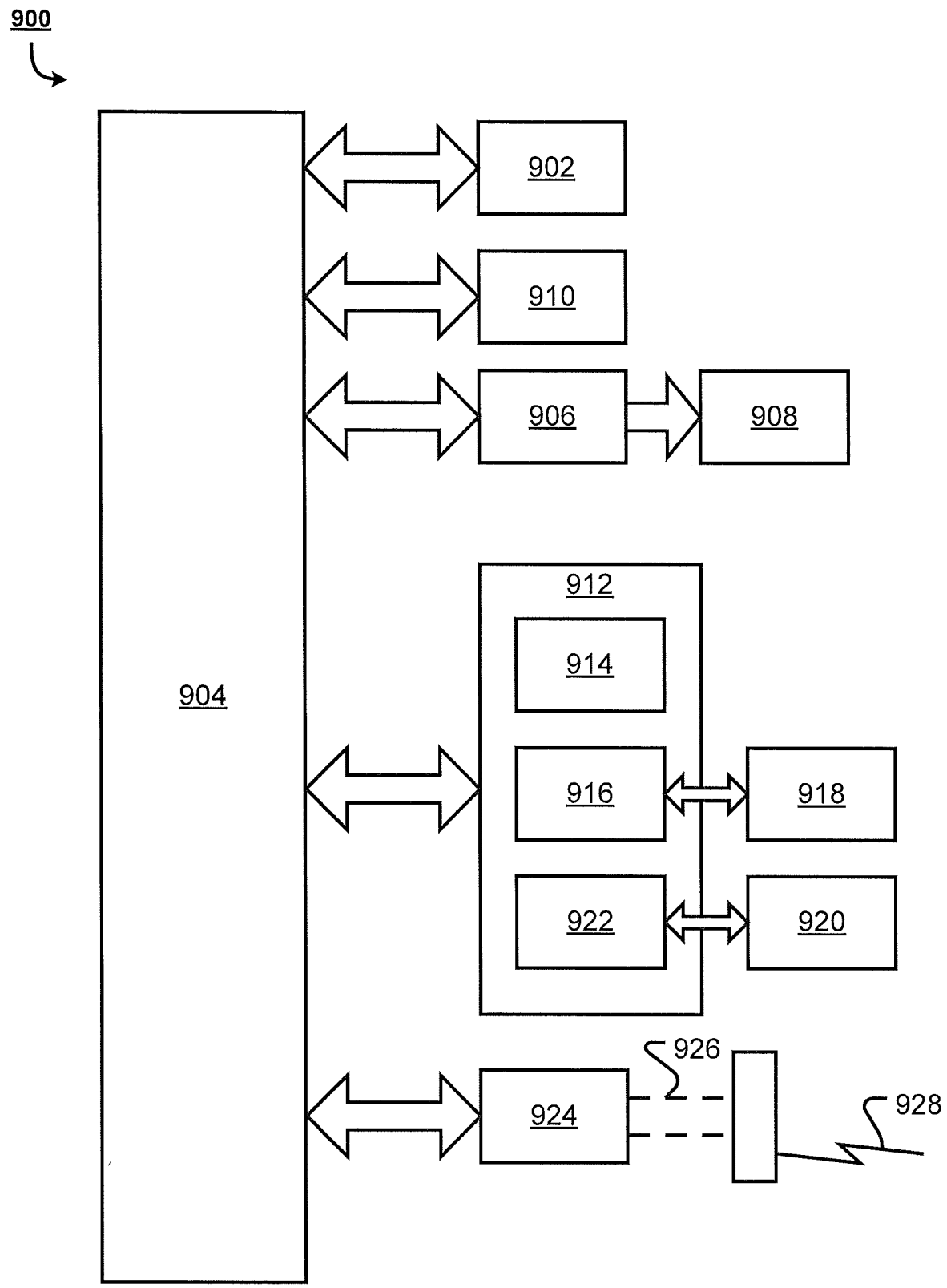
FIG. 9 is a block diagram of a computer system that be used to implement at least a portion of aspects herein.

FIG. 9 illustrates a computer-based system 900 that may constitute, include parts of, or be used to realize one or more of aspects of, e.g., platform 90, user interface 200, device 800, or methodologies and techniques described herein. Computer-based system 900 includes at least one processor, such as a processor 902. Processor 902 may be connected to a communication infrastructure 904, for example, a communications bus, a cross-over bar, a network, or the like. Various software aspects are described in terms of this example computer-based system 900. Upon perusal of the present description, it will become apparent to a person skilled in the relevant art(s) how to implement the present disclosure using other computer systems or architectures.

Computer-based system 900 includes a display interface 906 that forwards graphics, text, or other data from communication infrastructure 904 or from a frame buffer (not shown) for display on a display unit 908.

Computer-based system 900 further includes a main memory 910, such as random access memory (RAM), and may also include a secondary memory 912. Secondary memory 912 may further include, for example, a hard disk drive 914 or a removable storage drive 916, representing a floppy disk drive, a magnetic tape drive, an optical disk drive, etc. Removable storage drive 916 reads from or writes to a removable storage unit 918 in a well-known manner. Removable storage unit 918 may represent a floppy disk, magnetic tape, or an optical disk, and may be read by and written to by removable storage drive 916. As will be appreciated, removable storage unit 918 includes a computer usable storage medium having computer software or data stored therein.

In accordance with various aspects of the present disclosure, secondary memory 912 may include other similar devices for allowing computer programs or other instructions to be loaded into computer-based system 900. Such devices may include, for example, a removable storage unit 920 and an interface 922. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 920 to computer-based system 900.

Computer-based system 900 may further include communication interface 924. Communication interface 924 may allow software or data to be transferred between computer-based system 900 and external devices. Examples of communication interface 924 include, but may not be limited to a modem, a network interface (such as an Ethernet card), a communications port, a Personal Computer Memory Card International Association (PCMCIA) slot and card, or the like. Software or data transferred via communication interface 924 may be in the form of a number of signals, hereinafter referred to as signals 926, which may be electronic, electromagnetic, optical or other signals capable of being received by communication interface 924. Signals 926 may be provided to communication interface 924 via a communication path (e.g., channel) 928. Communication path 928 carries signals 926 and may be implemented using wire or cable, fiber optics, a telephone line, a cellular link, a radio frequency (RF) link, or other communication channels.

In this document, the terms "computer program medium" and "computer usable medium" are used to generally refer to media such as removable storage drive 916, a hard disk installed in hard disk drive 914, or the like. These computer program products provide software to computer-based system 900. The present disclosure is directed to such computer program products.

Computer programs (also referred to as computer control logic) may be stored in main memory 910 or secondary memory 912. The computer programs may also be received via communication interface 904. Such computer programs, when executed, enable computer-based system 900 to perform the functions consistent with the present disclosure, as discussed herein. In particular, the computer programs, when executed, enable processor 902 to perform the features of the present disclosure. Accordingly, such computer programs represent controllers of computer-based system 900.

In accordance with an aspect of the present disclosure, where the disclosure is implemented using a software, the software may be stored in a computer program product and loaded into computer-based system 900 using removable storage drive 916, hard disk drive 914, or communication interface 924. The control logic (software), when executed by processor 902, causes processor 902 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

Various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special-purpose computer, or other programmable data processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The systems, methods and computer program products disclosed in conjunction with various aspects of the present disclosure are embodied in systems and methods for facilitating multiple types of communications in systems and networks discussed herein.

Methodologies herein are described with specific aspects for ease of explanation with respect to various embodiments. However, methodologies embraced under the scope and spirit of the disclosure may vary, to include excluding particular aspects or comparisons described.

In embodiments, one or more methodologies, techniques, or other aspects herein can be combined in any order. Methodologies or aspects thereof may be performed simultaneously or in conjunction. Moreover, functionality of systems herein can be implemented in methods, and functionality of methods may be used by systems herein.

While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

What is claimed is:

1. A cloud infrastructure planning system, comprising:
   a plan of demand assistant configured to generate a site solution to a forecasted capacity demand set, wherein the site solution is based on a capacity correlation derived from a historical site solution data set;
   a plan of record advisor configured to generate a plan of record for the site solution, wherein the plan of record is based on an infrastructure correlation derived from a historical infrastructure data set;
   a plan of execution analyzer configured to generate an execution design defining equipment meeting the plan of record for a planned buildout, wherein the execution design is based on an equipment correlation derived from a historical equipment data set;
   a plan of availability evaluator configured to generate a resource prediction defining a service level based on the execution design, wherein the resource prediction is based on an availability correlation derived from a historical availability data set.

2. The cloud infrastructure planning system of claim 1, wherein the capacity correlation is determined by supervised machine learning.

3. The cloud infrastructure planning system of claim 1, wherein the infrastructure correlation is determined by unsupervised machine learning.

4. The cloud infrastructure planning system of claim 1, wherein the equipment correlation is determined by one or both of supervised and unsupervised machine learning.

5. The cloud infrastructure planning system of claim 1, wherein the availability correlation is determined by supervised machine learning.

6. The cloud infrastructure planning system of claim 1, further comprising:
   a first interface associated with one of the plan of demand assistant, the plan of record advisor, the plan of execution analyzer, and the plan of availability evaluator; and
   a second interface associated with another of the plan of demand assistant, the plan of record advisor, the plan of execution analyzer, and the plan of availability evaluator,
   wherein the first interface is provided to a first user and the second interface is provided to a second user different from the first user.

7. The cloud infrastructure planning system of claim 1, wherein a first one of the plan of demand assistant, the plan of record advisor, the plan of execution analyzer, and the plan of availability evaluator is effectuated on a first computer system, and
   wherein a second one of the plan of demand assistant, the plan of record advisor, the plan of execution analyzer, and the plan of availability evaluator is effectuated on a second computer system different from the first computer system.

8. The cloud infrastructure planning system of claim 1, wherein the historical site solution data set includes acceptance data concerning a prior site solution generated by the plan of demand assistant, and wherein the acceptance data includes whether a site solution was approved by a user, whether a site solution advanced to subsequent planning, whether a site solution was actually implemented through deployment of a plan based thereon, or a combination thereof.

9. The cloud infrastructure planning system of claim 8, wherein the historical infrastructure data set includes acceptance data concerning a prior plan of record generated by the plan of record advisor.

10. The cloud infrastructure planning system of claim 9, wherein the historical equipment data set includes acceptance data concerning a prior execution design generated by the plan of execution analyzer.

11. The cloud infrastructure planning system of claim 10, wherein the historical equipment data set includes one or more of overbooking data, service utilization data, and virtual network function sizing.

12. The cloud infrastructure planning system of claim 11, wherein the historical availability data set includes accuracy data concerning a prior resource prediction generated by the plan of availability evaluator.

13. A method, comprising:
receiving cloud infrastructure planning data;
generating a site solution to a forecasted capacity demand set, wherein the site solution is based on the cloud infrastructure planning data and a capacity correlation derived from a historical site solution data set;
generating a plan of record for the site solution implementing a planned buildout, wherein the plan of record is based on an infrastructure correlation derived from a historical infrastructure data set;
generating an execution design defining equipment meeting the plan of record for the planned buildout, wherein the execution design is based on an equipment correlation derived from a historical equipment data set;
generating a resource prediction defining a service level based on the execution design, wherein the resource prediction is based on an availability correlation derived from a historical availability data set.

14. The method of claim 13, wherein the capacity correlation is determined by supervised machine learning.

15. The method of claim 13, wherein the infrastructure correlation is determined by unsupervised machine learning.

16. The method of claim 13, wherein the equipment correlation is determined by one or both of supervised and unsupervised machine learning.

17. The method of claim 13, wherein the availability correlation is determined by supervised machine learning.

18. The method of claim 13, comprising:
providing a first interface configured to display a first one of the site solution, the plan of record, the execution design, and the resource prediction; and
providing a second interface configured to display a second one of the site solution, the plan of record, the execution design, and the resource prediction, wherein the second interface is different from the first interface.

19. The method of claim 13, wherein the historical equipment data set includes one or more of overbooking data, service utilization data, and virtual network function sizing.

20. A non-transitory computer-readable medium storing instructions that when executed by a processor effectuate operations comprising:
receiving cloud infrastructure planning data;
generating a site solution to a forecasted capacity demand set, wherein the site solution is based on the cloud infrastructure planning data and a capacity correlation derived from a historical site solution data set;
generating a plan of record for the site solution implementing a planned buildout, wherein the plan of record is based on an infrastructure correlation derived from a historical infrastructure data set;
generating an execution design defining equipment meeting the plan of record for the planned buildout, wherein the execution design is based on an equipment correlation derived from a historical equipment data set;
generating a resource prediction defining a service level based on the execution design, wherein the resource prediction is based on an availability correlation derived from a historical availability data set.

* * * * *